(12) United States Patent
Schmeer et al.

(10) Patent No.: US 10,259,583 B2
(45) Date of Patent: Apr. 16, 2019

(54) AIRPLANE SEAT DEVICE

(71) Applicant: RECARO Aircraft Seating GmbH & Co. KG, Schwaebisch Hall (DE)

(72) Inventors: Dietmar Schmeer, Braunsbach (DE); Mohammed Daher, Waiblingen (DE); Gunther Jaeger, Sulzbach-Laufen (DE); Andreas Wagner, Schwaebisch Hall (DE)

(73) Assignee: RECARO Aircraft Seating GmbH & Co. KG, Schwaebisch Hall (DE)

( * ) Notice: Subject to any disclaimer, the term of this patent is extended or adjusted under 35 U.S.C. 154(b) by 0 days.

(21) Appl. No.: 15/321,223

(22) PCT Filed: Jul. 2, 2015

(86) PCT No.: PCT/EP2015/065130
§ 371 (c)(1),
(2) Date: Dec. 22, 2016

(87) PCT Pub. No.: WO2016/001374
PCT Pub. Date: Jan. 7, 2016

(65) Prior Publication Data
US 2017/0152048 A1    Jun. 1, 2017

(30) Foreign Application Priority Data
Jul. 2, 2014  (DE) .................. 10 2014 109 285

(51) Int. Cl.
*B64D 11/06* (2006.01)
*B60N 2/427* (2006.01)

(52) U.S. Cl.
CPC ...... *B64D 11/0619* (2014.12); *B60N 2/42709* (2013.01); *B60N 2/42745* (2013.01)

(58) Field of Classification Search
CPC ............................................... B64D 11/0619
See application file for complete search history.

(56) References Cited

U.S. PATENT DOCUMENTS 2,660,222 A * 11/1953 Woodsworth ........ B60N 2/4221
                                                    180/274
5,454,622 A * 10/1995 Demopoulos ........ B60N 2/4221
                                                    188/374

(Continued)

FOREIGN PATENT DOCUMENTS

DE          198 53 981 A1   7/1999
DE    10 2011 122 186 A1    7/2013

(Continued)

OTHER PUBLICATIONS

Search Report dated May 22, 2015 issued in corresponding DE patent application No. 10 2014 109 285.6 (and partial English translation).
International Search Report of the International Searching Authority dated Oct. 2, 2015 issued in corresponding International Application No. PCT/EP2015/065132.
International Preliminary Report on Patentability dated Jan. 3, 2017 issued in corresponding International Application No. PCT/EP2015/065132.

(Continued)

*Primary Examiner* — Philip F Gabler
(74) *Attorney, Agent, or Firm* — Posz Law Group, PLC

(57) ABSTRACT

An aircraft seat device includes at least one backrest, at least one seat component coupled to the backrest, and a backrest impact safety device, which is designed to rigidly connect the backrest and the seat component in a locking position in at least one normal operating state and which is designed to at least partially reduce impact forces on the backrest at least in the event of crash by at least partially decoupling the backrest from the seat component in at least one further operating state. The backrest is designed to be locked in a locking position again after the partial decoupling.

17 Claims, 5 Drawing Sheets

(56) References Cited

U.S. PATENT DOCUMENTS

Figure 1:
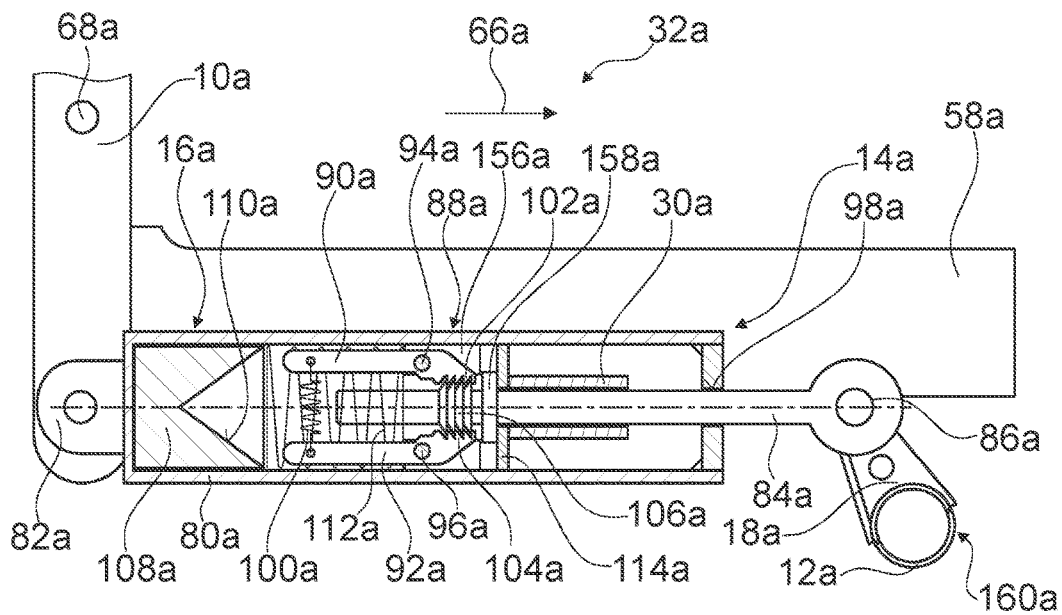

| | | | |
|---|---|---|---|
| 5,722,722 A * | 3/1998 | Massara | B60N 2/4228 |
| | | | 297/216.13 |
| 5,743,591 A * | 4/1998 | Tame | B60N 2/231 |
| | | | 297/216.1 |
| 6,244,656 B1 | 6/2001 | Mueller | |
| 6,565,151 B2 * | 5/2003 | Jarnail | B60N 2/4221 |
| | | | 244/122 R |
| 2014/0070578 A1 | 3/2014 | Szelagowski et al. | |
| 2017/0152047 A1 * | 6/2017 | Rebmann | B64D 11/0619 |

FOREIGN PATENT DOCUMENTS

| | | |
|---|---|---|
| DE | 10 2012 108 352 A1 | 3/2014 |
| EP | 0 556 884 A2 | 8/1993 |
| WO | 2010/054411 A1 | 5/2010 |

OTHER PUBLICATIONS

International Search Report of the International Searching Authority dated Oct. 2, 2015 issued in corresponding International Application No. PCT/EP2015/065130.
International Preliminary Report on Patentability dated Jan. 3, 2017 issued in corresponding International Application No. PCT/EP2015/065130.
Office Action dated Sep. 12, 2018 issued in corresponding EP patent application No. 15733464.0 (and English translation).
Office Action dated Sep. 5, 2018 issued in corresponding EP patent application No. 15733750.2 (and English translation).

\* cited by examiner

AIRPLANE SEAT DEVICE

CROSS REFERENCE TO RELATED APPLICATIONS

This application is a U.S. national stage application of PCT/EP2015/065130 filed on Jul. 2, 2015, which is based on German Patent Application No. 10 2014 109 285.6 filed on Jul. 2, 2014, the contents of which are incorporated herein by reference.

Prior Art

The invention relates to an airplane seat device according to the preamble of patent claim 1.

An airplane seat device having at least one backrest, having at least one seat component that is coupled to the backrest, and having a backrest impact safety device which in at least a normal operating state is provided for rigidly connecting the backrest to the seat component in a locked position and, in at least one further operating state, by way of at least partial decoupling of the backrest from the seat component, is provided for at least partially reducing impact forces on the backrest at least in the event of a crash has already been proposed.

The object of the invention lies in particular in providing a device of the generic type having improved properties in terms of safety. The object according to the invention is achieved by the features of patent claim 1, while advantageous design embodiments and refinements of the invention may be derived from the dependent claims.

Advantages of the Invention

The invention proceeds from an airplane seat device having at least one backrest, having at least one seat component that is coupled to the backrest, and having a backrest impact safety which in at least a normal operating state is provided for rigidly connecting the backrest to the seat component in a locked position and, in at least one further operating state, by way of at least partial decoupling of the backrest from the seat component, is provided for at least partially reducing impact forces on the backrest at least in the event of a crash.

It is proposed that the backrest after a partial decoupling is provided for being locked in a locked position again. Herein, a "backrest" is to be understood in particular to be a component of an airplane seat on which a person sitting on the airplane seat may support his/her back. Herein, a "seat component" is to be understood in particular to be a component of an airplane seat, such as in particular a seat frame, or part of a fixed structure of the airplane seat, such as a cross tube. In principle it is also conceivable that the seat component is configured as another component that is considered purposeful by a person skilled in the art, in particular as a structural component of an airplane seat. Herein, "coupled" is to be understood as meaning in particular interconnected. It is conceivable herein that two elements that are intercoupled are interconnected directly or indirectly by way of at least one further element. "Provided" is to be understood as meaning specially conceived and/or equipped. An object being provided for a specific function is to be understood in particular as the object fulfilling and/or carrying out this specific function in at least one application and/or operating state. A "normal operating state" herein is to be understood in particular to be an operating state during normal operation of the airplane seat device in particular during a state in which the latter is installed in an airplane and during operation of the airplane. A "locked position" herein is to be understood in particular to be a position in which forces may be transmitted by way of the backrest impact safety device, in particular from the backrest to the seat component and vice versa. "Rigidly connected" in this context is to be understood in particular to be fixed and provided for the transmission of a force. Herein, both a tensile force and a compression force may be transmitted between the backrest and the seat component in the case of a rigid connection. "Partial decoupling" herein is to be understood in particular to mean that a movement of the backrest and a movement of the seat component are mutually separated at least for a defined time and/or across a defined displacement path, such that the backrest may move in relation to the seat component for a defined time and/or across a defined displacement path. "Impact forces" herein are to be understood in particular to be forces which are created by objects such as in particular by a body of a passenger sitting on the airplane seat or by a head of the passenger sitting behind the airplane seat when impacting an element such as in particular the backrest. Impact forces herein are also to be understood to be forces which are created by the inertia of the components of the airplane seat, such as in particular the backrest, wherein these forces in the event of a crash also take effect when there is no passenger sitting on the airplane seat or on that airplane seat that is disposed behind the airplane seat. An "event of a crash" herein is to be understood to be in particular an overload event, that is to say an operating state in which forces that are higher than forces that are created by normal stress in the case of a normal flight operation act on the airplane seat device and/or on the airplane seat of which the airplane seat mounting unit is a part. "Locking" herein is to be understood in particular to mean keeping in a defined position, in particular in a locked position. "after a partial decoupling" herein is to be understood in particular to mean at a point in time following partial decoupling during the event of a crash. On account thereof, an airplane seat device may advantageously be provided which in the event of a crash protects a passenger sitting in an airplane seat from injury in a particularly advantageous manner, and which, the backrest having been pivoted by the backrest impact safety device during the event of a crash, may be locked in a position again so as to be able to advantageously keep free an escape path. On account thereof, a particularly safe airplane seat may be provided.

It is furthermore proposed that the backrest impact safety device after a partial decoupling is provided for being returned to a locked position. The backrest impact safety device herein is preferably kept in the locked position by way of a form fit. In principle, however, it is also conceivable for the backrest impact safety device to be locked by a magnetic force and/or electrically in the locked position. In principle, it is also conceivable for form-fitting connection in the locked position to be achieved upon partial decoupling during the event of a crash by way of a pyrotechnically triggered plastic deformation. On account thereof, the airplane seat device may advantageously be configured in a particularly advantageous manner and in particular in a minimalistic manner in terms of components.

It is furthermore proposed that the backrest impact safety device has at least one locking module which in a locked position blocks the backrest impact safety device, and in an unlocked position at least partially decouples the latter, wherein the backrest impact safety device is transferable from the unlocked position to the locked position. A "locking module" herein is to be understood in particular to be a module which has at least two force-fitting and/or form-fitting elements which are configured so as to be mutually communicating and which are intercoupled in a locked position, wherein forces may be transmitted between the force-fitting and/or form-fitting elements. In an unlocked position, the force-fitting and/or form-fitting elements of the locking module are at least partially released from one another and may be moved relative to one another at least in a defined region. Herein, preferably no force transmission between the force-fitting and/or form-fitting elements is possible in the unlocked position. On account thereof, locking of the backrest after a partial decoupling may be realized by way of the backrest impact safety device in a particularly simple manner.

It is furthermore proposed that the locking module has at least one locking element which is deflectable counter to an elastic force and which in a resting state holds the backrest impact safety device in the locked position. "Deflectable counter to an elastic force" is to be understood in particular to be deflectable counter to the force which is provided by a spring element, wherein the spring element may be a mechanical, an electromagnetic, or a pneumatic spring. In principle, it is also conceivable for the elastic force to be generated by the elastically deflected locking element per se. A "resting state" herein is to be understood in particular to be a state of the locking element into which the latter moves in a self-acting manner if and when there are no triggering forces, in particular by an inertia module, acting on said locking element. On account thereof, the locking module may be configured in a particularly simple manner.

It is furthermore proposed that the backrest impact safety device has at least one inertia module which in the event of a crash is provided at least for unlocking the backrest impact safety device. An "inertia module" herein is understood in particular to be a module which by virtue of mass inertia is triggered and released from a locked position. The inertia module herein is preferably formed by an element which by way of the inertia thereof is provided for carrying out an activation. The inertia module herein, by way of the mass inertia thereof, in the case of deceleration forces taking effect in particular in the event of a crash, is deflected from a locked position. The inertia module herein is preferably released from the locked position in an axial manner along a displacement axis. In principle, it is also conceivable for the inertia module to be displaced along a displacement line of a different configuration, for example on a circular path, if and when the inertia module configures a type of pendulum. Herein, a triggering force which is required for deflecting the inertia module from the locked position thereof may be set by way of the mass of the inertia module. On account thereof, the triggering force may be set in a simple manner for seat of dissimilar size or for seat spacings of dissimilar size in an airplane. In principle, it is also conceivable for the inertia module to have at least one electronic acceleration sensor and an electrically and/or electronically actuatable locking mechanism, wherein the locking mechanism is actuated and opened in the case of an acceleration that is detected by the at least one acceleration sensor. Herein, it is conceivable in principle for the locking mechanism to be triggered by pyrotechnics or by way of an electromechanical switch. On account thereof, the backrest impact safety device in the event of a crash may be triggered in an advantageously early manner and the risk of injury to a passenger may thus be reduced in particular.

It is furthermore proposed that the inertia module for unlocking the backrest impact safety device is provided for at least temporarily deflecting at least the locking element. By "at least temporarily deflecting" herein is to be understood in particular that the at least one locking element is deflected at least briefly during the event of a crash, such that a force-fitting and/or form-fitting connection that is established in a locked position between the locking element and a communicating form-fitting element may be released. In principle, it is conceivable for the locking element to remain deflected until the latter is actively pushed back into a locked position again or resets itself in a self-acting manner. In principle, it is also conceivable for the inertia module to be merely provided for permitting a temporary deflection of the locking element, not actively deflecting the latter. A "locked position" herein is to be understood in particular to be a position of the backrest impact safety device, in which the backrest impact safety device is locked and, in particular, in which the backrest is fully coupled to the seat component. "Deflecting" herein is to be understood in particular to be moved out of a defined position, wherein this may be an axial movement and/or a pivoting movement. On account thereof, the locking module may advantageously be configured in a particularly advantageous manner.

It is furthermore provided that the backrest impact safety device has at least one spring element which is provided for holding the inertia module in the locked positioning thereof. A "spring element" is to be understood in particular to be a macroscopic element which has at least one extent which in a normal operating state is elastically modifiable by at least 10%, in particular by at least 20%, preferably by at least 30% and particularly advantageously by at least 50%, and which in particular generates a counterforce that depends on the modification of the extent and is preferably proportional to the modification and counteracts the modification. The spring element herein is preferably configured as a mechanical spring such as a helical spring, for example, wherein it is also conceivable for the spring to be configured as an electromagnetic spring or a fluid-compression spring such as a gas compression spring, for example. In principle, it is also conceivable for the spring element to be formed from an elastically deformable material such as from an elastomer, for example. "A locked positioning" herein is to be understood in particular to be a positioning of the inertia module, in which the inertia module does not unblock the backrest impact safety device. The locked positioning herein may describe a defined region in which the inertia module may move without unlocking the backrest impact safety device. On account thereof, an acceleration that is required for unlocking the backrest impact safety device may be set in a particularly simple manner.

It is furthermore proposed that the backrest impact safety device has at least one housing which comprises at least one linkage element which is provided for being coupled to the seat component or to the backrest, and has at least one element which is displaceably mounted in the housing and which comprises at least one linkage element which is provided for being coupled to the seat component or to the backrest. A "housing" herein is to be understood in particular to be at least one element which configures a housing which at least partially encloses at least one interior space. The housing herein in a fitted state is preferably configured so as to be closed and is formed by at least two housing elements. In principle, it is also conceivable for the housing to be configured so as to be at least partially opened. The element which herein is mounted in the housing is preferably mounted so as to be axially displaceable in the housing. In principle, however, it is also conceivable for the element which is mounted in the housing to be displaceable along a circular path or another displacement path which is considered purposeful by a person skilled in the art. On account thereof, the backrest impact safety device may be configured in a particularly advantageous manner.

It is furthermore proposed that the housing element and the piston element, mounted so as to be axially displaceable, are intercoupled by way of the locking module at least in the locked position of the backrest impact safety device. On account thereof, the backrest impact safety device may advantageously be locked in the locked position in a particularly simple manner.

It is moreover proposed that the backrest impact safety device has at least one deceleration element which for absorbing inertia energy of the backrest after the partial decoupling is provided for being plastically deformed. A "deceleration element" herein is to be understood in particular to be an element which in at least one operating state is provided for absorbing and/or dissipating energy, so as thus to deprive another system, such as in particular the backrest, of energy. The deceleration element herein is preferably configured as an element which is elongated by way of plastic deformation, and dissipates energy by way of the plastic deformation. The deceleration element herein is preferably formed from a metal, and during the deformation absorbs deformation energy. Herein, a force required for deforming the deceleration element may be set by way of a material thickness, the material, and a shape of the deceleration element. In principle, it is also conceivable for the deceleration element to be configured as a hydraulic or gas jack cylinder, the cylinder plunger of which may be deployed from a housing, counter to the pressure of a gas or of a liquid. In principle, it is also conceivable for the deceleration element to be formed by at least two chambers which are mutually separated by at least one aperture which is provided with at least one passage bore, wherein a fluid is forced through the passage bores of the aperture for deceleration. In principle, it is likewise conceivable for the deceleration element to be configured as an element which is provided for being destroyed in order for another element to be decelerated, so as to dissipate energy on account thereof. On account thereof, an impact force may be set and the backrest may be slowed down in a targeted manner.

It is furthermore proposed that the backrest impact safety device has at least one deceleration element which for absorbing inertia energy of the backrest after the partial decoupling is provided for compressing a fluid. On account thereof, an impact force may be set and the backrest may be slowed down in a targeted manner, and the deceleration element may be configured in a particularly advantageous manner.

It is furthermore provided that the at least one elastically deflectable locking element is configured as a pivotable lever which is fixedly connected to a housing. On account thereof, the locking element may be configured in a particularly advantageous manner.

It is furthermore provided that the at least one elastically deflectable locking element is configured as an elastically deformable lever which is fixedly connected to a piston. On account thereof, the locking element may particularly advantageously be configured in a cost-effective manner.

It is furthermore provided that the inertia module in the event of a crash is provided for being deflected from a locked positioning, prior to the impact forces taking effect. "Prior to the impact forces taking effect" herein is to be understood in particular as meaning a point in time before the body of a passenger hits the backrest of the airplane seat device. On account thereof, an airplane seat device which in the event of a crash protects a passenger sitting in an airplane seat in a particularly advantageous manner may be advantageously provided.

The airplane seat device according to the invention herein is not to be limited to the application and embodiment as described above. In particular, the airplane seat device according to the invention, in order to fulfil a functional mode as described herein, may have a number of individual elements, components, and individual parts, that deviates from the number mentioned herein.

DRAWINGS

Further advantages are derived from the following description of the drawings. Four exemplary embodiments of the invention are illustrated in the drawings. The drawings, the description, and the claims contain numerous features in mutual combination. A person skilled in the art will expediently also consider the features individually and combine the latter so as to form further purposeful combinations.

Figure 2:
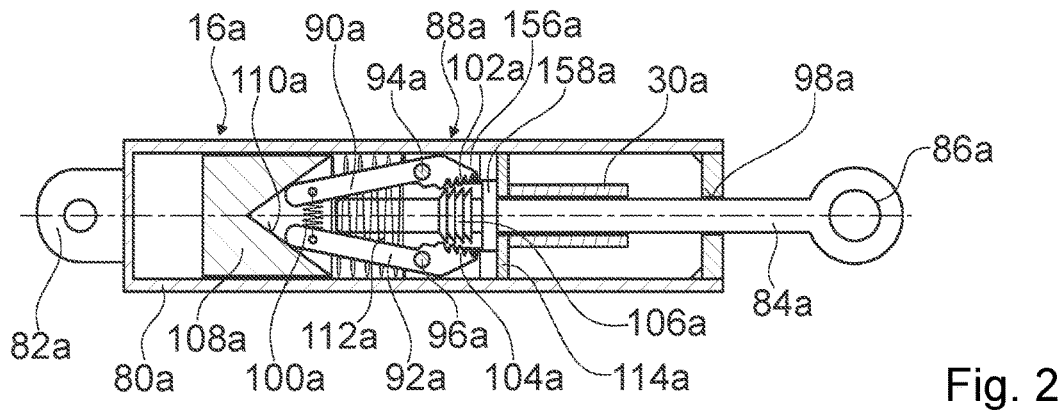
Figure 3:
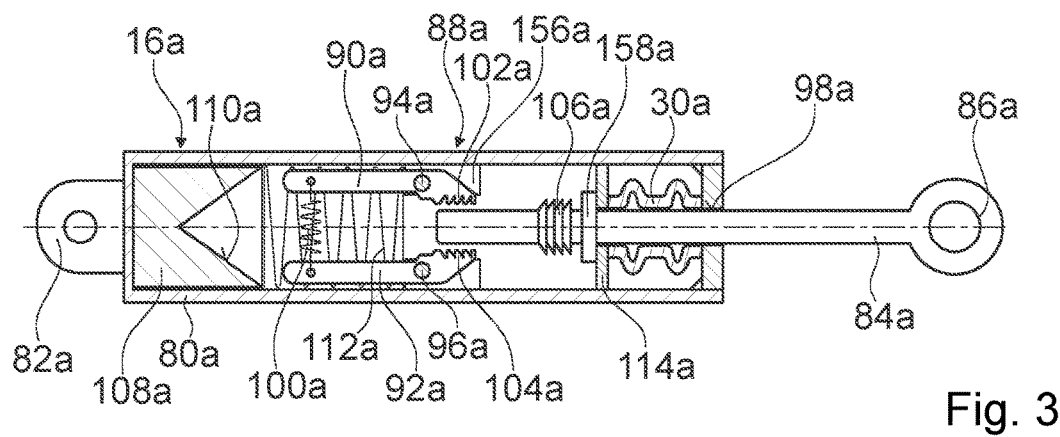
Figure 4:
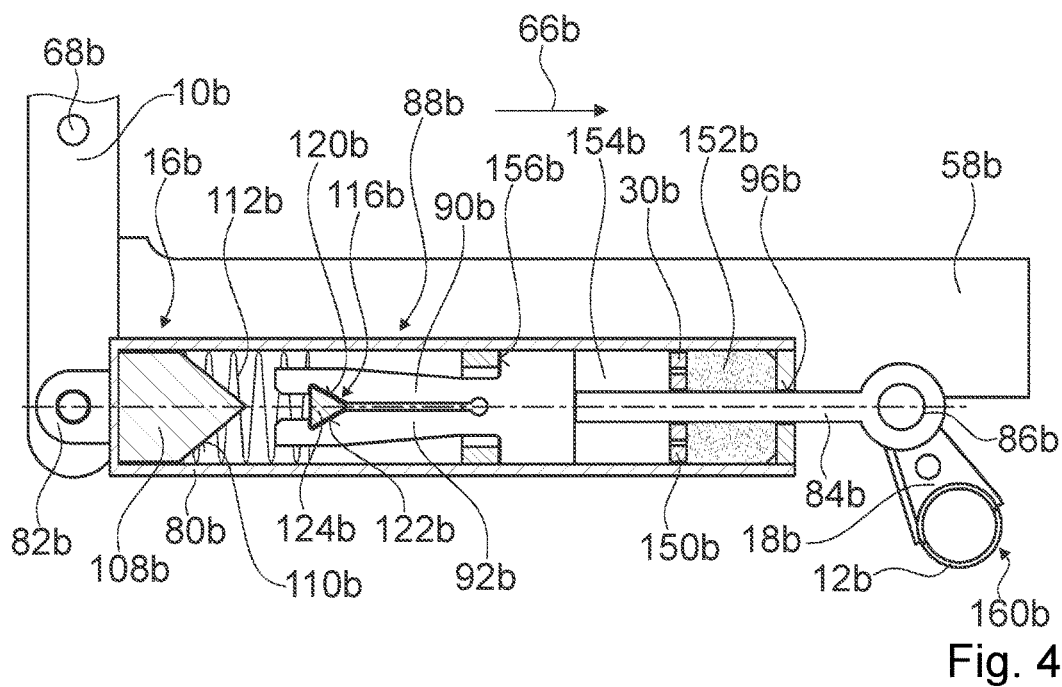
Figure 5:
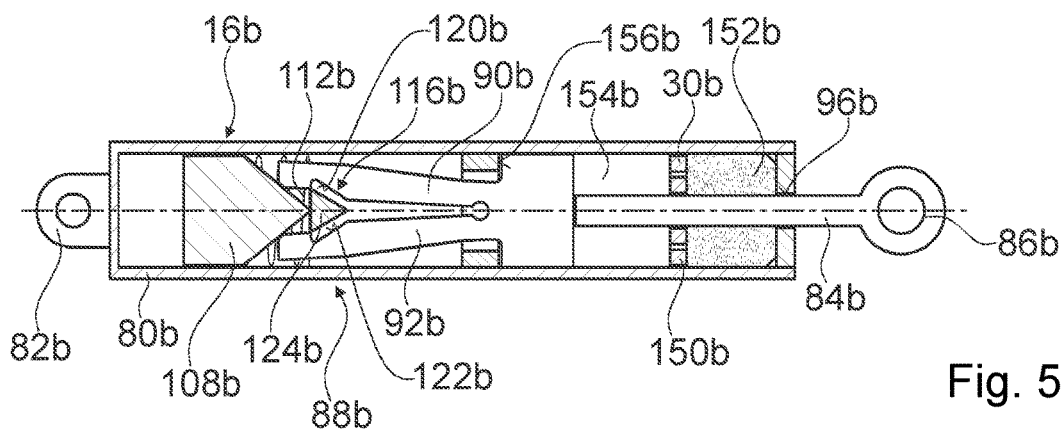
Figure 6:
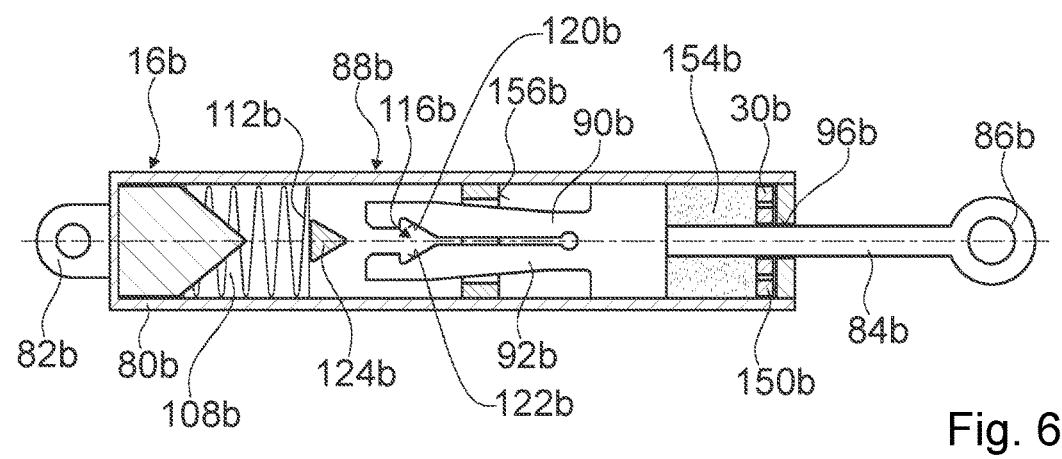
Figure 7:
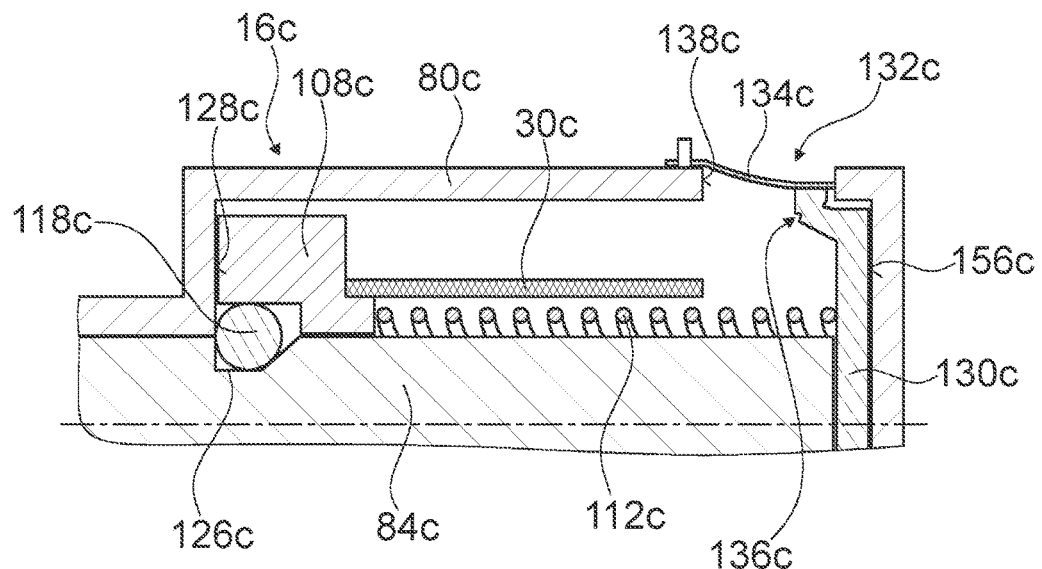
Figure 8:
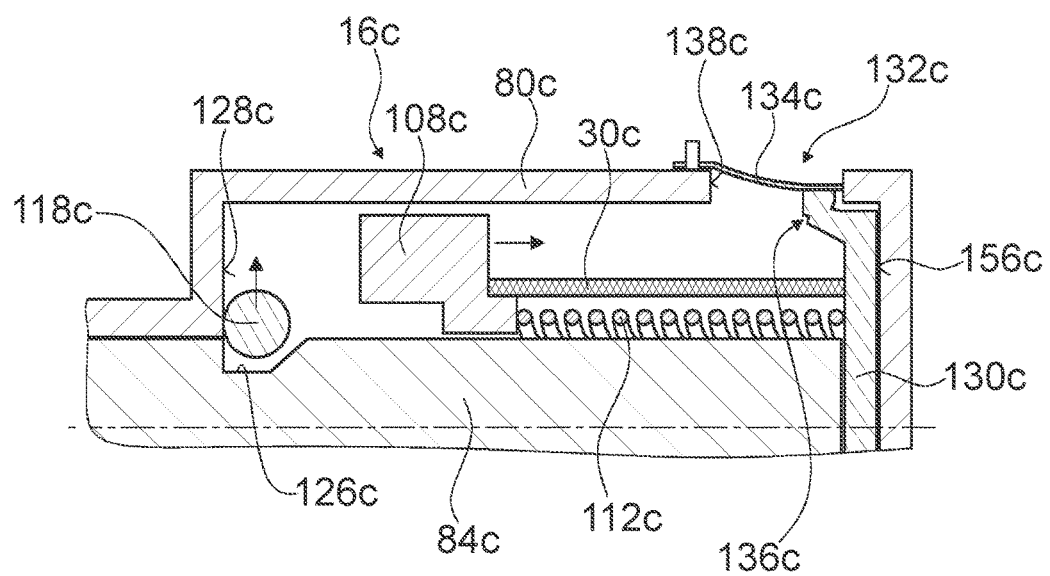
Figure 9:
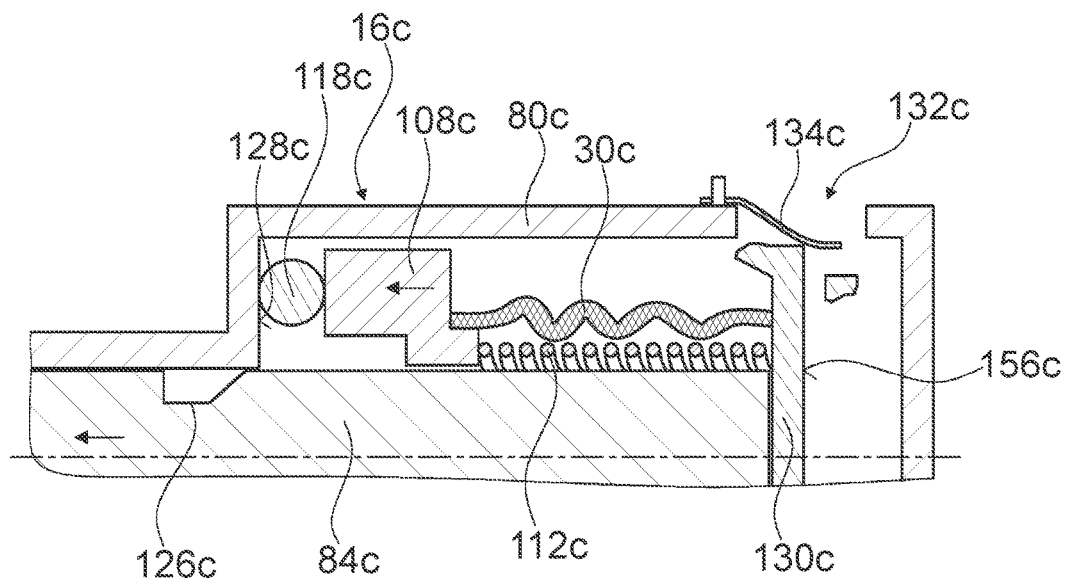
Figure 10:
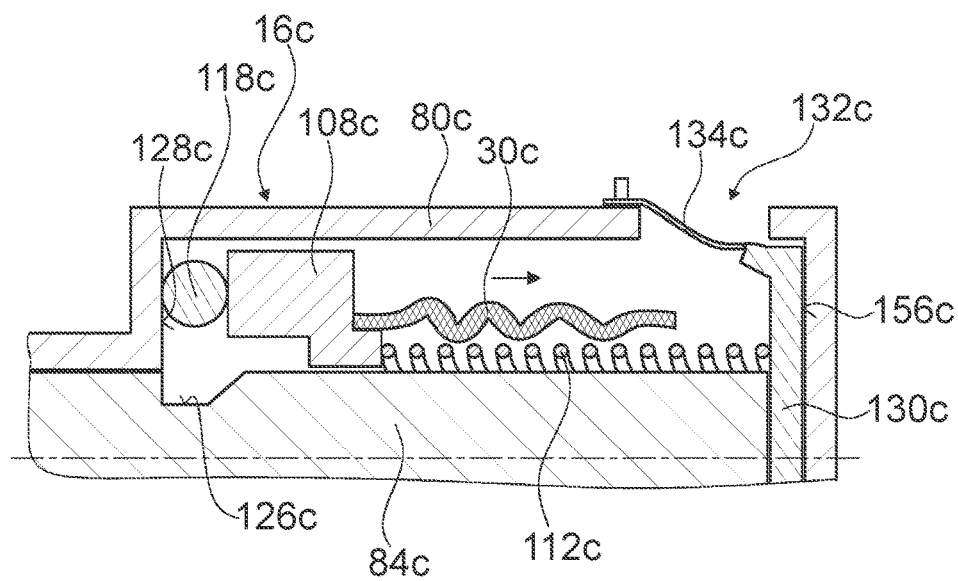
Figure 11:
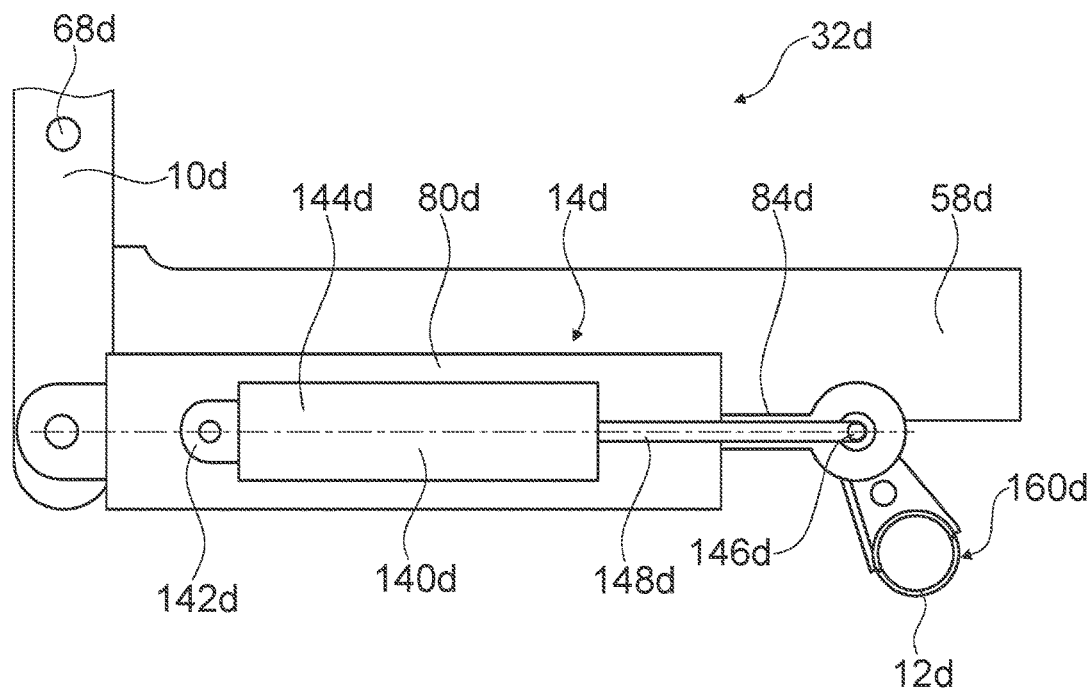

In the drawings:

FIG. 1 schematically shows a sectional view of an airplane seat device according to the invention, in a first exemplary embodiment having a backrest impact safety device in a locked position;

FIG. 2 schematically shows a sectional view of the backrest impact safety device of the airplane seat device in the first exemplary embodiment, just after having been deflected from the locked position;

FIG. 3 schematically shows a sectional view of the backrest impact safety device of the airplane seat device in the first exemplary embodiment, after a partial unlocking, having a deformed deceleration element;

FIG. 4 schematically shows a sectional view of an airplane seat device according to the invention, in a second exemplary embodiment having a backrest impact safety device in a locked position;

FIG. 5 schematically shows a sectional view of the backrest impact safety device of the airplane seat device in the second exemplary embodiment, just upon having been deflected out of the locked position;

FIG. 6 schematically shows a sectional view of the backrest impact safety device of the airplane seat device in the second exemplary embodiment, upon partial unlocking, having a deformed deceleration element;

FIG. 7 schematically shows a partial sectional view of an airplane seat device according to the invention, in a third exemplary embodiment, having a backrest impact safety device in a locked position;

FIG. 8 schematically shows a partial sectional view of the backrest impact safety device during unlocking;

FIG. 9 schematically shows a sectional view of the backrest impact safety device of the airplane seat device in the third exemplary embodiment, upon partial unlocking, having a deformed deceleration element;

FIG. 10 schematically shows a sectional view of the backrest impact safety device of the airplane seat device in the third exemplary embodiment in a locked position, upon partial unlocking; and FIG. 11 schematically shows a view of an airplane seat device according to the invention, in a fourth exemplary embodiment, having a backrest impact safety device and an additional force element.

DESCRIPTION OF THE EXEMPLARY EMBODIMENTS

FIGS. 1 to 3 show an airplane seat device according to the invention, in a first exemplary embodiment. The airplane seat device herein is part of a partially illustrated airplane seat 32a. The airplane seat 32a herein is part of an airplane that is not illustrated in more detail. The airplane seat 32a herein, in a fitted state, is mounted in an airplane cabin of the airplane. To this end, the airplane seat 32a has a mounting unit 160a. The airplane seat 32a is mounted on a cabin floor of the airplane cabin by means of the mounting unit 160a. The cabin floor configures a mounting plane for the airplane seat 32a. The airplane seat 32a herein is configured as part of a seat row which comprises more than one airplane seat 32a, preferably at least three airplane seats 32a. The airplane seat 32a herein configures a sitting direction. The sitting direction is defined as that direction in which a passenger sits on the airplane seat 32a. The sitting direction herein is configured so as to be parallel with a flight direction 66a. The flight direction 66a herein is formed by a main extent of the airplane cabin. The mounting unit 160a herein is configured as a common mounting unit 160a of the airplane seats 32a of the airplane seat row. The airplane seat device comprises a backrest 10a. The backrest 10a herein is provided so that a person sitting on the airplane seat 32a, of which the airplane seat device is a part, may support his/her back on the backrest 10a. The backrest 10a is disposed so as to be pivotable in relation to the mounting unit 160a. The backrest 10a herein, by way of a bearing point 68a is pivotably articulated on a seat divider (not illustrated in more detail). The airplane seat device furthermore comprises a seat component 12a. The seat component 12a is configured as a transverse reinforcement unit which is provided for reinforcing the backrest 10a in the transverse direction of the transverse reinforcement unit. Moreover, the seat component 12a, configured as a transverse reinforcement unit, is provided for connecting the one side of the airplane seat 32a, of which the airplane seat device is a part, to the further side of the airplane seat 32a. The seat component 12a, configured as a transverse reinforcement unit, herein extends between the seat dividers (not illustrated in more detail) of the airplane seat 32a. The seat component 12a, configured as a transverse reinforcement unit, is mounted so as to be rotatable in the seat dividers (not illustrated in more detail). The seat component 12a, configured as a transverse reinforcement unit, is provided so as to be rotated in the case of movement of the backrest 10a. The seat component 12a, configured as a transverse reinforcement unit, is configured as a torsion element. In the present exemplary embodiment, the seat component 12a, configured as a transverse reinforcement unit, is configured as a torsion tube. Furthermore, the airplane seat device has a seat base 58a. In principle, it is also conceivable for the seat component 12a to be configured as a seat base or as a component of the seat structure. The seat base 58a configures a seat face. The seat base 58a is coupled to the backrest 10a. Herein, the backrest 10a and the seat base 58a are interconnected in an articulated manner. The backrest 10a and the seat base 58a, by way of kinematics (not illustrated in more detail) of the airplane seat device, are pivotably intercoupled. Herein, the backrest 10a and the seat base 58a are mutually displaceable to various positions, and may be fixed in these various positions. Herein, the backrest 10a and the seat base 58a are preferably mutually displaceable in a stepless manner. In principle, it is also conceivable for the backrest 10a in a normal operating state to be rigidly connected to the seat base 58a or to a seat structure, and for the airplane seat 32a to have only one seat position.

The airplane seat device comprises a backrest impact safety device 14a. The backrest impact safety device 14a, at least in a normal operating state, is provided for rigidly connecting the backrest 10a to the seat component 12a in a locked position. In the normal operating state which reflects a normal and orderly use of the airplane seat 32a, forces may be transmitted from the backrest 10a to the seat component 12a by way of the backrest impact safety device 14a. In the normal operating state in which the backrest impact safety device 14a rigidly connects the backrest 10a to the seat component 12a in the locked position, forces may be transmitted in a forward manner, that is to say in the flight direction 66a, and counter to the flight direction 66a. The backrest impact safety device 14a is provided for partially decoupling the backrest 10a from the seat component 12a in at least an operating state. Through the partial decoupling of the backrest 10a from the seat component 12a, the backrest 10a and the seat component 12a in the event of a crash may exert a mutual relative movement, so as to reduce the risk of injury to a passenger sitting on the airplane seat 32a. The backrest impact safety device 14a decouples the backrest 10a from the seat component 12a in particular in the event of a crash having a deceleration counter to the flight direction 66a. In the event of a crash, the backrest impact safety device 14a at least partially reduces the impact forces that act on the backrest 10a, on account of which the force acting on a passenger who exerts this force on the backrest 10a is also reduced. The backrest 10a and the seat component 12a, configured as a transverse reinforcement unit, are intercoupled by means of the backrest impact safety device 14a. The backrest impact safety device 14a has a locked position and an unlocked position. In the locked position, the backrest impact safety device 14a is locked, and the backrest 10a is fixedly coupled to the seat component 12a. In the locked position of the backrest impact safety device 14a, the backrest 10a by way of the backrest impact safety device 14a may not move in relation to the seat component 12a. In the unlocked position, the backrest 10a is decoupled from the seat component 12a and may be moved in relation to the seat component 12a. Herein, in the unlocked position of the backrest impact safety device 14a, the backrest 10a in relation to the seat component 12a may be pivoted about an advantageous angle.

The backrest impact safety device 14a decouples the backrest 10a from the seat component 12a prior to the impact forces taking effect on the backrest 10a. On account thereof, the backrest 10a in the event of a crash is decoupled from the seat component 12a before a passenger impacts the backrest 10a and transmits the impact forces to the backrest 10a. On account thereof, the backrest 10a, in the case of an impact of the passenger on the backrest 10a, that is to say when the impact forces take effect, is partially decoupled from the seat component 12a and may thus be moved in relation to the seat component 12a, thus absorbing and/or advantageously redirecting part of the impact forces before or during the impact of the passenger on the backrest 10a, such that an impact on the backrest 10a is less hard for the passenger.

The backrest 10a after a partial decoupling is provided for being locked in a locked position again. On account thereof, the backrest 10a, after partial decoupling and the movement in relation to the seat component 12a that is thereby performed, may be locked in the locked position again. The locked position herein may be the same as that in which the backrest 10a is locked in the normal operating position; it is also conceivable, however, for the locked position in which the backrest 10a upon partial decoupling is locked again to be different from the locked position in the normal operating state. On account thereof, the backrest 10a upon readjustment from the locked position in the event of a crash, may again be secured in the locked position by a passenger, so as to in this way enable a safe escape path in which the backrest 10a is not in the way. Furthermore, upon locking of the backrest 10a, handhold loads may advantageously be reintroduced into the mounting unit 160a of the airplane seat 32a by way of the locked backrest 10a, on account of which a passenger may advantageously hold on to the backrest 10a, without the latter being pivoted. The backrest impact safety device 14a, upon partial decoupling, is provided for being moved back to a locked position and, on account thereof, for locking the backrest 10a in the locked position again upon partial decoupling. In principle, it would also be conceivable for the airplane seat device to have a device which is configured separately from the backrest impact safety device 14a and which is provided for moving the backrest 10a to a locked position again upon partial decoupling. It is conceivable herein for the separately configured device to be constructed in a similar manner and to function like the backrest impact safety device 14a which is described hereunder. In principle, it is also conceivable for the separately configured device to have only the same effect as the backrest impact safety device 14a which is described hereunder, but for the former to be of different construction.

The backrest impact safety device 14a comprises a housing 80a. The housing 80a is provided for encapsulating the backrest impact safety device 14a. The housing 80a is configured as a closed housing. The housing 80a is configured as a cylinder. The housing 80a, configured as a cylinder, has a central axis which corresponds to a direction of main extent of the housing 80a. The housing 80a encloses an interior space. Herein, the housing in a fitted state encloses the entire interior space. On account thereof, an ingress of liquids or dirt into the interior space of the housing 80a may be advantageously prevented, and a reliability of the backrest impact safety device 14a may be improved in this way. In principle, however, it is also conceivable for the housing 80a to be configured so as to be at least partially opened. The housing 80a comprises a linkage element 82a. The linkage element 82a is configured as a form-fitting element and is provided for rigid connection to a linkage element of equivalent configuration. The linkage element 82a is disposed at a first axial end of the housing 80a, thus configuring a first axial end of the backrest impact safety device 14a. The housing 80a is rigidly connectable to the backrest 10a by way of the linkage element 82a. In a fitted state, the backrest impact safety device 14a is connected to the backrest 10a by way of the linkage element 82a of the housing 80a. The backrest impact safety device 14a comprises an element 84a which is mounted so as to be axially displaceable in the housing 80a. The element 84a is configured as a piston element. The element 84a, configured as a piston element, in the fitted state extends into the interior space of the housing 80a. In the fitted state, a first axial end of the element 84a faces the first axial end of the housing 80a. By way of the first axial end, the element 84a extends from a second axial end of the housing 80a beyond a center between the first end and the second end of the housing 80a. The element 84a is configured so as to be at least substantially rotationally symmetrical, and has a central axis. Herein, at least one region of the element 84a, which region is disposed in the housing 80a, is configured so as to be rotationally symmetrical. The central axis of the element 84a in the fitted state is aligned so as to be coaxial with the central axis of the housing 80a. The element 84a protrudes from the housing 80a at the second axial end of the housing 80a that lies opposite the first axial end of the housing 80a. To this end, the housing 80a at the second axial end has a passage opening 98a. The element 84a comprises a linkage element 86a. The linkage element 86a is configured as a form-fitting element and is provided for rigid connection to a linkage element of equivalent configuration. The element 84a is rigidly connectable to the seat component 12a by way of the linkage element 86a. In a fitted state, the backrest impact safety device 14a is connected to the seat component 12a by way of the linkage element 86a of the element 84a. The linkage element 86a is disposed at a second axial end of the element 84a. On account thereof, the linkage element 86a configures a second axial end of the backrest impact safety device 14a. The backrest impact safety device 14a has a detent 156a. The detent 156a is provided for limiting the element 84a to a maximum position in the housing 80a. The detent 156a is configured by elevations which rise inwardly in the interior space of the housing 80a. The detent 156a delimits a movement of the element 84a in the housing 80a in the direction of the first axial end of the housing 80a. The element 84a in the locked position impacts the detent 156a. The element 84a, so as to contact the detent 156a, has an elevation 158a which in the locked position impacts the detent 156a.

The backrest impact safety device 14a has a locked position and an unlocked position. In principle, it is also conceivable for the backrest impact safety device 14a to have at least two locked positions which differ from one another. In the locked position of the backrest impact safety device 14a, the element 84a that is mounted so as to be axially displaceable in the housing 80a is rigidly connected to the housing 80a. In the locked position of the backrest impact safety device 14a, the element 84a cannot be displaced in the housing 80a. In the unlocked position of the backrest impact safety device 14a, the element 84a that is mounted so as to be axially displaceable in the housing 80a may be displaced by a defined displacement path. Herein, the element 84a may be moved from the locked position of the backrest impact safety device 14a in a triggering direction which is directed away from the linkage element 82a of the housing 80a. On account thereof, the backrest impact safety device 14a may be extended in length by way of a displacement of the element 84a from the locked position. A spacing between the linkage element 82a of the housing 80a and the linkage element 86a of the element 84a is enlarged by displacing the element 84a from the locked position in the triggering direction.

The backrest impact safety device 14a has at least one locking module 88a which blocks the backrest impact safety device 14a in a locked position. In the unlocked position, the locking module 88a at least partially decouples the backrest impact safety device 14a. The backrest impact safety device 14a is transferable from the unlocked position to the locked position by means of the locking module 88a. In the locked position of the backrest impact safety device 14a, the housing 80a and the element 84a, which is mounted so as to be axially displaceable, are intercoupled by way of the locking module 88a. The locking module 88a has two locking elements 90a, 92a, which are deflectable counter to an elastic force. The locking elements 90a, 92a are configured as pivotable lever elements. The locking elements 90a, 92a are disposed in the interior space of the housing 80a. The locking elements 90a, 92a are configured as elongate lever elements which have a main direction of extent which in the fitted state is aligned so as to be parallel with a main direction of extent of the housing 80a. The locking elements 90a, 92a, in a manner orthogonal to the main direction of extent thereof, each have a segment of a circle as cross section. The locking elements 90a, 92a herein are mutually disposed so as to be in a mirror image in relation to a central axis of the cylindrically configured housing 80a. The locking elements 90a, 92a each have one bearing point 94a, 96a by way of which the locking elements 90a, 92a are pivotably disposed in the housing 80a. To this end, the bearing points 94a, 96a each configure one first housing-side bearing element (not described in more detail) which is configured by the housing 80, and one second bearing element which is formed with by the respective locking element 90a, 92a. The bearing elements each are configured as a friction bearing. In principle, it would also be conceivable for roller bearings to be used for mounting the locking elements 90a, 92a. The bearing points 94a, 96a herein each are disposed on a side that faces the second axial end of the housing 80a. A forward axial end of the locking elements 90a, 92a that in the fitted state is assigned to the second axial end of the housing 80a, may be outwardly pivoted to an opened position by way of the bearing points 94a, 96a. The two locking elements 90a, 92a, at the rearward axial ends thereof which in the fitted state face the first axial end of the housing 80a, are intercoupled by way of a spring element 100a. The spring element 100a exerts a spring force on the locking elements 90a, 92a, pushing apart the locking elements 90a, 92a at the rearward axial end. The spring element 100a herein is configured as a helical spring. In principle, it would also be conceivable for the spring element to be configured as another spring element that is considered purposeful by a person skilled in the art. The spring element 100a, by way of the spring force thereof, pushes the locking elements 90a, 92a to a resting state. In the resting state, the locking elements 90a, 92a of the locking module 88a lock the backrest impact safety device 14a. In order for the backrest impact safety device 14a to be locked, the locking elements 90a, 92a at the forward end thereof each have one form-fitting element 102a, 104a. The form-fitting elements 102a, 104a herein each are configured as a toothed profile which is disposed on an inwardly directed internal side of the locking elements 90a, 92a. In principle, it is also conceivable for the form-fitting elements 102a, 104a to have another shape. The form-fitting elements 102a, 104a of the locking elements 90a, 92a configure a part of the locking module 88a that is fixedly connected to the housing. The form-fitting elements 102a, 104a are fixedly coupled to the housing 80a by way of the pivotable mounting of the locking elements 90a, 92a. For the form-fitting connection to the form-fitting elements 102a, 104a of the locking elements 90a, 92a, the element 84a has a form-fitting element 106a of a corresponding configuration. The form-fitting element 106a is configured as an encircling toothing on the element 84a, which toothing is configured so as to be complementary to the toothed profiles of the form-fitting elements 102a, 104a of the locking elements 90a, 92a. In the resting position of the locking elements 90a, 92a, the form-fitting elements 102a, 104a engage in the form-fitting element 106a which is formed by the element 84a. The element 84a and the housing 80a, by way of the connection between the form-fitting elements 102a, 104a, 106a, are rigidly interconnected by way of the locking elements 90a, 92. Herein, the spring element 100a, by way of the redirection by way of the bearing points 94a, 96a, pushes each of the form-fitting elements 102a, 104a into the form-fitting element 106a. On account thereof, a retention force is increased, and a greater force may be transmitted by way of the form-fitting connection between the form-fitting elements 102a, 104a of the locking elements 90a, 92a, and the form-fitting element 106a of the element 84a. In principle, it would also be conceivable for the locking module 88a to be constructed in a different manner and, for example, to deflect the locking elements 90a, 92 by an electromagnetic force in an unlocked position, and block by an electromagnetic force in a locked position.

The backrest impact safety device 14a comprises an inertia module 16a. The inertia module 16a is provided for at least partially unlocking the backrest impact safety device 14a in the event of a crash. In the normal operating state of the backrest impact safety device 14a, the inertia module 16a is disposed in a locked position. The locked position of the inertia module 16a herein is formed by a region in which the inertia module 16 may be disposed without the latter partially unlocking the backrest impact safety module 14a. The inertia module 16a is formed by a mass element 108a which is disposed so as to be axially displaceable in the interior space of the housing 80a. The mass element 108a is disposed at a first axial end of the housing 80a. The mass element 108a has a cylindrical shape. The mass element 108a is mounted in the interior space of the housing 80a by way of a friction bearing. The mass element 108a at the first end thereof which in the fitted state faces the first axial end of the housing 80a, has a flat wall. The mass element 108a at a second end which in the fitted state faces the locking elements 90a, 92a has an activation contour 110a. The activation contour 110a is of a concave configuration. The activation contour 110a has a conical shape. The activation contour 110a, from the first end of the mass element 108a, extends inward from a radially external region in the direction of the second end of the mass element 108a. The activation contour 110a is provided for deflecting the locking elements 90a, 92a from the resting position thereof. To this end, the mass element 108a, in order to deflect the locking elements 90a, 92a, is provided for pushing the locking elements 90a, 92a toward one another in each case at the rearward end thereof. In principle, it is also conceivable for the activation contour 110a to have another shape such as a spherical shape, an elliptical shape, or a mixed shaped, for example. A triggering deceleration may be set by the configuration of the activation contour 110a, and by the contour of the locking elements 90a, 92a, and the weight of the mass element 108a. A triggering speed may likewise be set.

The inertia module 16a for unlocking the backrest impact safety device 14a is provided for at least temporarily deflecting the locking elements 90a, 92a. In the event of a crash, the inertia module 16a for unlocking the backrest impact safety device 14a is provided for being deflected from the locked position thereof. The inertia module 16a herein is provided to be deflected from a locked position prior to the impact forces taking effect. If and when the inertia module 16a is deflected from the locked position thereof, the backrest impact safety device 14a reaches the unlocked position from the locked position. To this end, the inertia module 16a configures the mass element 108a. The mass element 108a is provided for imparting mass to the inertia module 16a, which mass by way of the mass inertia thereof in the event of a crash deflects the inertia module 16a in the backrest impact safety device 14a from the locked position of the former, at least partially unlocking the backrest impact safety device 14a by deflecting the locking elements 90a, 92a.

The backrest impact safety device 14a has at least one spring element 112a which is provided for holding the inertia module 16a in the locked position thereof. The spring element 112a is disposed in the interior space of the housing 80a. The spring element 112a in functional terms is disposed between the housing 80a and the inertia module 16a. The spring element 112*a* is supported on the housing 80*a* and exerts a spring force on the inertia module 16*a* which is mounted so as to be axially displaceable in the housing 80*a*. The spring element 112*a* by way of a first end bears on the mass element 108*a*. The spring element 112*a* by way of a second end is supported on an internal side of the housing 80*a* by way of a linkage region (not illustrated in more detail). The spring element 112*a* herein is disposed between the second end of the housing 80*a* and the mass element 108*a* of the inertia module 16*a*. The spring element 112*a* is configured as a compression spring. On account thereof, the mass element 108*a* of the inertia module 16*a* in the housing 80*a* is pushed in the direction of the first end of the housing 80*a*, into the locked position of said mass element 108*a*. In the event of a crash, the mass element 108*a* must move in the triggering direction, counter to the spring force of the spring element 112*a*, so as to unlock the backrest impact safety device 14*a*. A necessary acceleration which is required for partially unlocking the backrest impact safety device 14*a* may be set in a simple manner and thus be adapted to various airplane seat models and to other circumstances by way of the rigidity of the spring element 112*a* and/or by way of the mass of the mass element 108*a*. The spring element 112*a* herein is configured as a helical spring. In principle, it is also conceivable for the spring element 112*a* to be configured as another spring element that is considered purposeful to a person skilled in the art, such as for example a gas-pressure spring, a magnetic and/or electric spring element, or a spring element which generates a restoring force by compression of a fluid.

The backrest impact safety device 14*a* comprises a deceleration element 30*a*. The deceleration element 30*a* is provided for absorbing inertia energy of the backrest 10*a* upon partial decoupling of the backrest impact safety device 14*a*. The deceleration element 30*a* in the event of a crash absorbs at least part of inertia forces which act on the backrest 10*a*. In order for the inertia energy to be absorbed the deceleration element 30*a* is provided for being elastically deformed. The deceleration element 30*a* is disposed in the interior space of the housing 80*a*. The deceleration element 30*a* in functional terms is disposed between the element 84*a* and the housing 80*a*. The deceleration element 30*a* upon partial decoupling is provided for slowing down a relative movement of the element 84*a* in relation to the housing 80*a* ahead of a terminal detent. The deceleration element 30*a* is configured as a sleeve that is capable of plastic deformation. The deceleration element 30*a* encloses the element 84*a* which is configured in the manner of a piston. The element 84*a* has an entrainment element 114*a*. The entrainment element 114*a* is fixedly connected to the element 84*a*. In principle, it is also conceivable for the entrainment element 114*a* to be configured so as to be integral to the element 84*a*. The deceleration element 30*a* is disposed between the entrainment element 114*a* and the second end of the housing 80*a*. If and when the element 84*a* upon partial decoupling is displaced in the triggering direction in the housing 80*a*, that is to say extending the backrest impact safety device 14*a* in length, the entrainment element 114*a* entrains the deceleration element 30*a* until the latter impacts an axial internal wall at the second end of the housing 80*a*. In the course of the further movement of the element 84*a* in the triggering direction the deceleration element 30*a* is jammed and plastically deformed between the entrainment element 114*a* and the internal wall at the second end of the housing 80*a*. A kinetic energy of the backrest 10*a* is converted to deformation energy and thus dissipated by the plastic deformation of the deceleration element 30*a*. On account thereof, the one readjustment of the element 84*a* in relation to the housing 80*a*, and thus a readjustment of the backrest 10*a* upon partial decoupling is decelerated in a damped manner prior to a maximum readjustment and is not abruptly slowed down.

A reaction of the airplane seat device having the backrest impact safety device 14*a* in the event of a crash is to be briefly described hereunder. FIG. 1 schematically shows the airplane seat device having the backrest impact safety device 14*a* in the locked position thereof. The inertia module 16*a* is in the locked position thereof. The housing 80*a* is rigidly connected to the element 84*a* by way of the locking module 88*a*. On account thereof, the linkage element 82*a* which is coupled to the backrest 10*a*, and the linkage element 86*a* which is coupled to the seat component 12*a*, are rigidly interconnected. Forces may be transmitted between the backrest 10*a* and the seat component 12*a* by way of the linkage elements 82*a*, 86*a*, by way of the backrest impact safety device 14*a*. Should any deceleration counter to the flight direction 66*a* now arise in the event of a crash, the backrest impact safety device 14*a* being aligned parallel with said flight direction 66*a*, the housing 80*a* which by way of the backrest 10*a* is coupled to the mounting unit 160*a* is decelerated, and the inertia module 16*a* which is axially mounted in the housing 80*a* is deflected by way of the inertia of the former from the locked position thereof and is displaced in the direction of the second end of the housing 80*a*, counter to the spring force of the spring element 112*a*. The locking elements 90*a*, 92*a*, by way of the activation contour 110*a* of the mass element 108*a* of the inertia module 16*a*, are pivoted from the resting position of the former, and the form-fitting connection between the locking elements 90*a*, 92*a*, coupled to the housing 80*a*, and the element 84*a*, by way of the form-fitting elements 102*a*, 104*a*, 106*a* is cancelled. On account thereof, the backrest impact safety device 14*a* is partially unlocked. The element 84*a* may be displaced in the housing 80*a* in relation to the housing 80*a*. The backrest 10*a* is now at least partially decoupled from the seat component 12*a*.

By way of the partial decoupling of the backrest 10*a* from the seat component 12*a*, the backrest 10*a* may rotate about the bearing point 68*a* by means of which the backrest 10*a* is pivotably mounted. Herein, by virtue of mass inertia, a major part of the backrest 10*a* is accelerated in the direction of the flight direction 66*a* in the event of a crash. The major part of the backrest 10*a* moves in the direction of the flight direction 66*a* in the event of a crash. By virtue of the mass inertia, and by virtue of the pivotable mounting of the backrest 10*a* about the bearing point 68*a*, a lower region of the backrest 10*a* moves counter to the flight direction 66*a*. By way of the inertia of the backrest 10*a* a momentum about the bearing point 68*a* that pushes forward an upper end of the backrest 10*a* is introduced into the backrest 10*a*. A lower end at which the backrest impact safety device 14*a* is linked to the backrest 10*a* is moved counter to the flight direction 66*a*. Herein, the housing 80*a* by way of the coupling to the lower end of the backrest 10*a* is pulled backward, counter to the flight direction 66*a*. On account of the element 84*a* being released from the housing 80*a*, the element 84*a* which is axially mounted in the housing 80*a* may be displaced in relation to the housing 80*a*. The backrest impact safety device 14*a* is drawn apart by the movement of the backrest 10*a*, and a spacing between the linkage elements 82*a*, 86*a* is enlarged. The deceleration element 30*a* having the element 84*a* is entrained by way of the entrainment element 114*a*, and is also moved in relation to the housing 80*a*. The deceleration element 30*a* by way of the relative movement between the housing 80*a* and the element 84*a* is jammed between the entrainment element 114a and the housing 80a and deformed. On account thereof, the deceleration element 30a decelerates the relative movement between the housing 80a and the element 84a, and on account thereof the pivoting movement of the backrest 10a.

The backrest impact safety device 14a upon partial decoupling is provided to be moved back to a locked position. Through the returning of the backrest impact safety device 14a upon partial decoupling, the backrest 10a upon readjustment during the event of a crash may be blocked again, and an escape path may be advantageously kept free for a passenger. The backrest 10a after the event of a crash by way of the upper region thereof is pivoted forward in the flight direction 66a. If and when the backrest 10a is pivoted backward again, the housing 80a is displaced in the flight direction 66a again, and is thus displaced in relation to the element 84a. The locking elements 90a, 92a, held in the resting position thereof by the spring element 100a, are again deflected outward by the oblique toothing of the form-fitting element 106a which is formed by the element 84a. On account thereof, the form-fitting elements 102a, 104a can again be brought into engagement with the form-fitting element 106a of the element 84a. On account thereof, the housing 80a may again be rigidly coupled to the element 84a, and the backrest impact safety device 14a on account thereof may again be locked.

Three further exemplary embodiments of the invention are shown in FIGS. 4 to 11. The descriptions and drawings hereunder are substantially limited to the respective points of difference between the exemplary embodiments, wherein in terms of identically referenced components, in particular in terms of components having identical reference signs, reference may also be made in principle to the drawings and/or to the description of the other exemplary embodiments, in particular to those of FIGS. 1 to 3. For differentiation of the exemplary embodiments, the suffix a is added to the reference signs of the exemplary embodiment in FIGS. 1 to 3. The suffix a is replaced with the suffixes b to d in the exemplary embodiments of FIGS. 4 to 11.

FIGS. 4 to 6 show an airplane seat device according to the invention in a second exemplary embodiment. The airplane seat device herein is part of a partially illustrated airplane seat 32b. The airplane seat 32b herein is part of an airplane (not illustrated in more detail). The airplane seat 32b in the fitted state herein is mounted in an airplane cabin of the airplane. The airplane seat device comprises a backrest 10b. The backrest 10b herein is provided so that a person sitting on the airplane seat 32b, of which the airplane seat device is a part, may support his/her back on the backrest 10b. The backrest 10b herein is pivotably articulated to a seat divider (not illustrated in more detail) by way of a bearing point 68b. The airplane seat device furthermore comprises a seat component 12b. The seat component 12b is configured as a transverse reinforcement unit which is provided for reinforcing the backrest 10b in the transverse direction of the transverse reinforcement unit. Moreover, the seat component 12b, configured as a transverse reinforcement unit, is provided for connecting the one side of the airplane seat 32b, of which the airplane seat device is a part, to the further side of the airplane seat 32b. The airplane seat device furthermore has a seat base 58b. In principle, it is also conceivable for the seat component 12b to be configured as a seat base or as a component of the seat structure. The seat base 58b configures a seat face. The seat base 58b is coupled to the backrest 10b.

The airplane seat device comprises a backrest impact safety device 14b. The backrest impact safety device 14b at least in a normal operating state is provided for rigidly connecting the backrest 10b to the seat component 12b in a locked position. In the normal operating state which reflects a normal and orderly use of the airplane seat 32b, forces may be transmitted from the backrest 10b into the seat component 12b by way of the backrest impact safety device 14b. The backrest impact safety device 14b is provided for partially decoupling the backrest 10b from the seat component 12b in at least an operating state. Through the partial decoupling of the backrest 10b from the seat component 12b, the backrest 10b and the seat component 12b in the event of a crash may exert a mutual relative movement, so as to reduce the risk of injury to a passenger sitting on the airplane seat 32b.

The backrest impact safety device 14b decouples the backrest 10b from the seat component 12b prior to the impact forces on the backrest 10b taking effect. The backrest 10b upon partial decoupling is provided for being locked in a locked position again. On account thereof, the backrest 10b, upon partial decoupling and following the movement in relation to the seat component 12b that is thereby performed, may be locked in the locked position again. The locked position herein may be the same as that in which the backrest is locked in the normal operating position; it is also conceivable, however, for the locked position in which the backrest 10b upon partial decoupling is locked again to be different from the locked position in the normal operating state. The backrest impact safety device 14b comprises a housing 80b. The housing 80b is provided for encapsulating the backrest impact safety device 14b. The housing 80b comprises a linkage element 82b. The linkage element 82b is configured as a form-fitting element, and is provided for rigid connection to a linkage element of equivalent configuration. The linkage element 82b is disposed at a first axial end of the housing 80b, thus configuring a first axial end of the backrest safety impact device 14b. The housing 80b is rigidly connectable to the backrest 10b by way of the linkage element 82b. The backrest impact safety device 14b comprises an element 84b which is mounted so as to be axially displaceable in the housing 80b. The element 84b is configured as a piston element. The element 84b, configured as a piston element, in the fitted state extends in the interior space of the housing 80b. A first axial end of the element 84b in the fitted state faces the first axial end of the housing 80b. The element 84b, at a second axial end of the housing 80b that lies opposite the first axial end of the housing 80b, protrudes from the housing 80b. The element 84b comprises a linkage element 86b. The linkage element 86b is configured as a form-fitting element and is provided for rigid connection to a linkage element of equivalent configuration. The element 84b is rigidly connectable to the seat component 12b by way of the linkage element 86b. The backrest impact safety device 14b has a detent 156b. The detent 156b is provided for limiting the element 84b to a maximum position in the housing 80b. The detent 156b is configured by elevations which rise inwardly in the interior space of the housing 80b. In particular, the detent 156b is configured by a bushing which is incorporated in the interior space of the housing 80b. The detent 156b delimits a movement of the element 84b in the direction of the first axial end of the housing 80b in the housing 80b. The element 84b impacts the detent 156b in the locked position.

The backrest impact safety device 14b has at least one locking module 88b which in a locked position blocks the backrest impact safety device 14b. In particular the locking module 88b of the backrest impact safety device 14b differs from the locking module of the respective backrest impact safety device of the first exemplary embodiment of FIGS. 1 to 3. By contrast to the locking module of the respective backrest impact safety device of the first exemplary embodiment, the locking module 88b has two locking elements 90b, 92b which are configured as elastically deformable levers which are fixedly connected to the piston. The locking elements 90b, 92b are configured so as to be integral to the element 84b. The locking elements 90b, 92b are formed from an elastically deformable material. The locking elements 90b, 92b in the fitted state extend from the element 84b in the direction of a first end of the housing 80b. The locking elements 90b, 92b are disposed so as to be mutually spaced apart. The locking elements 90b, 92b, by way of a first end that faces the element 84b each are connected to the element 84b. The locking elements 90b, 92b in the direction of the second ends thereof that face away from the element 84b have an increasing spacing. The two locking elements 90b, 92b in the region of the second ends thereof conjointly configure a form-fitting element 116b. The form-fitting element 116b is formed by two mutually facing notches 120b, 122b in the internal sides of the locking elements 90b, 92b. The notches 120b, 122b in the locking elements 90b, 92b face one another. The notches 120b, 122b herein are incorporated in the respective locking element 90b, 92b at an identical spacing from the element 84. The two notches 120b, 122b, in a non-deflected state of the locking elements 90b, 92b, conjointly configure a triangular shape. A tip of the triangular form-fitting element 116b herein is directed in the direction of the element 84b. The locking module 88b has a form-fitting element 124b which is fixedly connected to the housing. The form-fitting element 124b is rigidly connected to the housing 80b. The form-fitting element 124b extends transversely through the interior space of the housing 80b. The form-fitting element 124b herein is configured so as to be equivalent to the form-fitting element 116b which is configured by the locking elements 90b, 92b. The form-fitting element 124b has a triangular cross section.

In principle, it is also conceivable for the form-fitting element 124b to have another cross section such as a semi-circular shape, a circular shape, or an elliptic shape, for example. The respective form-fitting element 116b configured by the locking elements 90b, 92b would be configured so as to be accordingly equivalent. The form-fitting element 124b herein is formed by a triangular bolt which is routed through the interior space of the housing 80b. The bolt which forms the form-fitting element 124b herein is fixedly connected to the housing 80b. In the locked position of the backrest impact safety device 14b, the locking elements 90b, 92b embrace the form-fitting element 124b. The form-fitting element 124b in the locked position is disposed in the notches 120b, 122b of the locking elements 90b, 92b that form the form-fitting element 116b. On account thereof, the form-fitting element 124b and the form-fitting element 116b are interconnected in a form-fitting manner. On account thereof, the backrest impact safety device 14b is locked, and a force may be transmitted between the backrest 10b and the seat component 12b by way of the backrest impact safety device 14b.

The backrest impact safety device 14b comprises an inertia module 16b. The inertia module 16b is provided for at least partially unlocking the backrest impact safety device 14b in the event of a crash. The inertia module 16b is configured so as to be substantially identical to the inertia module of the first exemplary embodiment of FIGS. 1 to 3. The inertia module 16b is formed by a mass element 108b which is disposed so as to be axially displaceable in the interior space of the housing 80b. The mass element 108b is disposed at a first axial end of the housing 80b. By contrast to the mass element of the inertia module of the first exemplary embodiment of FIGS. 1 to 3, the mass element 108b has a differently molded activation contour 110b. The activation contour 110b is of convex configuration. The activation contour 110b has a convex conical shape. The activation contour 110b from a first end of the mass element 108b that faces the locking elements 90b, 92b, extends inward from a radially external region in the direction of the locking elements 90b, 92b. By way of the activation contour 110b which is configured in a convex wedge-like manner, the inertia module 16b is provided for releasing the form-fitting connection between the form-fitting elements 116b, 124b. To this end, the activation contour 110b which is configured in a convex wedge-like manner is provided for pushing apart the locking elements 90b, 92b so as thus to release the form-fitting element 124, fixedly connected to the housing, from the enlacement of the form-fitting element 116b that is formed by the locking elements 90b, 92b. The activation contour 110b is provided for deflecting the locking elements 90b, 92b from the resting position thereof. The mass element 108b, for deflecting the locking elements 90b, 92b, is provided for pushing apart each of the locking elements 90b, 92b at the second end thereof.

The backrest impact safety device 14b has at least one spring element 112b which is provided for holding the inertia module 16b in the locked position thereof. The backrest impact safety device 14b comprises a deceleration element 30b. The deceleration element 30b is provided for absorbing inertia energy of the backrest 10b upon partial decoupling of the backrest impact safety device 14b. In functional terms, the deceleration element 30b is configured so as to be identical to the respective deceleration element of the backrest impact safety device of the first exemplary embodiment of FIGS. 1 to 3. In terms of the design embodiment, the deceleration element 30b differs from the respective deceleration element of the backrest impact safety device of the first exemplary embodiment of FIGS. 1 to 3. The deceleration element 30b is configured as a damper element. The deceleration element 30b, configured as a damper element, is provided for absorbing kinetic energy without plastic deformation. The deceleration element 30b is configured as a gas compression spring. The deceleration element 30b is provided for absorbing energy by a fluid flow. The deceleration element 30b has an aperture 150b which mutually separates two chambers 152b, 154b. The aperture 150b is fixedly connected to the element 84b. The aperture 150b mutually separates the two chambers 152b, 154b in the interior of the housing 80b from radially inside, from the element 84b, to radially outside, to the housing 80b. The aperture 150b has a plurality of passage bores (not illustrated in more detail) by way of which the two chambers 152b, 154b that are mutually separated by the aperture 150b are in fluidic communication. A fluid from the one chamber 152b may reach the other chamber 154b through the passage bores. The fluid herein may be a gas or a liquid. In principle, it is conceivable for the passage bores in a normal state to be closed by membranes which in the event of a crash are destroyed by the movement of the element 84b and of the fluid, thus exposing the passage bores. If and when the element 84b in the event of a crash is moved in relation to the housing 80b, the chamber 152b is reduced in size by the aperture 150b, and the fluid disposed in the chamber flows through the passage bores of the aperture 150b into the chamber 154b. On account thereof, energy is dissipated, and the backrest 10b is decelerated. A functional mode of the deceleration element 30b in the event of a crash corresponds to that of the previous exemplary embodiment.

As in the case of the backrest safety impact device of the first exemplary embodiment, the backrest impact safety device 14b upon partial decoupling may be latched into the locked position again. Herein, in a manner analogous to the first exemplary embodiment, the element 84b by way of a movement of the backrest 10b is moved in relation to the housing 80b such that the form-fitting element 116b of the locking elements 90b, 92b, and the form-fitting element 124b, fixedly connected to the housing, reengage. To this end, the locking elements 90b, 92b are again pushed by way of the form-fitting element 124b, snap-fitting again with the notches 120b, 122b thereof into the form-fitting element 124b by way of a restoring force which is generated by the deflection of the locking elements 90b, 92b. On account thereof, the backrest impact safety device 14b is again in the locked position, and the backrest is locked again.

FIGS. 7 to 10 show an airplane seat device according to the invention in a third exemplary embodiment. The airplane seat device herein is part of an airplane seat (not illustrated in more detail). The airplane seat device comprises a backrest and a seat component that correspond to those of the preceding exemplary embodiments and that are not described in more detail herein. The seat component is configured as a transverse reinforcement unit which is provided for reinforcing the backrest in the transverse direction of the transverse reinforcement unit. The airplane seat device comprises a backrest impact safety device 14c. The backrest impact safety device 14c at least in a normal operating state is provided for rigidly connecting the backrest and the seat component in a locked position. The backrest impact safety device 14c is connected to the backrest and to the seat component in a manner corresponding to the backrest impact safety devices of the preceding exemplary embodiments. In the normal operating state which reflects a normal and orderly use of the airplane seat, forces may be transmitted from the backrest to the seat component by way of the backrest impact safety device 14c. The backrest impact safety device 14c is provided for partially decoupling the backrest from the seat component in at least an operating state. The backrest impact safety device 14c decouples the backrest from the seat component prior to the impact forces on the backrest taking effect. The backrest is provided for being locked in a locked position again upon partial decoupling.

The backrest impact safety device 14c comprises a housing 80c. The housing 80c is provided for encapsulating the backrest impact safety device 14c. The housing 80c comprises a linkage element (not illustrated in more detail) by way of which the housing 80c in the fitted state is coupled to the seat component. The backrest impact safety device 14c comprises an element 84c which is mounted so as to be axially displaceable in the housing 80c. The element 84c is configured as a piston element. The element 84c, configured as a piston element, in the fitted state extends into the interior space of the housing 80c. The element 84c comprises a linkage element (not illustrated in more detail) by way of which the element 84c in the fitted state is coupled to the backrest.

The backrest impact safety device 14c has a locking module 88c which in a locked position blocks the backrest impact safety device 14c. In particular the locking module 88c of the backrest impact safety device 14c differs from the locking module of the respective backrest impact safety device of the preceding exemplary embodiments. The locking module 88c comprises a coupling element 118c. The coupling element 118c is configured as a ball. The housing 80c and the element 84c in a locked position are interconnected by the coupling element 118c. The element 84c has a depression 126c in which the coupling element 118c, configured as a ball, is disposed in the locked position. For the sake of clearer illustration, the depression 126c herein is not drawn to scale in the figures. The depression 126c is not as deep as illustrated in the figures, so as to prevent canting of the coupling element 118c. The housing 80c configures a shoulder 128c. In the locked position, the coupling element 118c bears on the depression 126c and on the shoulder 128c in a form-fitting manner. On account thereof, the housing 80c and the element 84c in the locked position are interconnected by the coupling element 118c. The backrest impact safety device 14c comprises an inertia module 16c. In order for the coupling element 118c to be secured in the locked position, the backrest impact safety device 14c has the inertia module 16c. The inertia module 16c is furthermore provided for at least partially unlocking the backrest impact safety device 14c in the event of a crash. The inertia module 16c is formed by a mass element 108c which is disposed so as to be axially displaceable in the interior space of the housing 80c. In the locked position, the inertia module 16c is disposed above the coupling element 118c, thus holding the coupling element 118c in the depression 126c of the element 84c. The form-fitting connection between the housing 80c and the element 84c is secured by way of the inertia module 16c. If and when the inertia module 16c is deflected counter to a flight direction in the event of a crash, the inertia module 16c releases the coupling element 118c, releasing the form-fit between the housing 80c and the element 84c by way of the coupling element 118c. On account thereof, the backrest impact safety device 14c is at least partially unlocked, and the element 84c may be axially displaced in the housing 80c. In principle, it is also conceivable for the backrest impact safety device 14c to have further coupling elements 118c and depressions 126c by way of which the housing 80c and the element 84c are interconnected in a form-fitting manner.

The backrest impact safety device 14c has a spring element 112c which is provided for holding the inertia module 16c in the locked position thereof. The spring element 112c is configured in a manner corresponding to that of the preceding exemplary embodiments. The spring element 112c is configured as a helical spring. The spring element 112c is disposed between the inertia module 16c and a support wall 130c of the element 84c. In the locked position, the element 84c by way of the support wall 130c bears on an internal wall of the housing 80c.

The housing 80c on the circumference thereof has an opening 132c. In principle, it is also conceivable for the housing 80c on the circumference thereof to have further such openings 132c, for which the following description may also be used. The opening 132c is disposed at a rearward end of the housing 80c. The support wall 130c protrudes into the opening 132c of the housing 80c. The backrest impact safety device 14c has a leaf-spring element 134c. The leaf-spring element 134c is fixedly linked to an external side of the housing 80c, protruding into the opening 132c. By way of a loose end, the leaf-spring element 134c in the locked position bears on the support wall 130c of the element 84c (see FIG. 7). The support wall 130c has a default breaking point 136c level with a lower edge of the opening 132c. The region above the default breaking point 136c is provided for being severed at an edge 138c of the opening 132c during the event of a crash, if and when the element 84c is axially displaced within the housing 80c (see FIG. 9). If and when the region above the default breaking point 136c is severed, the support wall 130c may be displaced within the housing 80c. As an alternative to the default breaking point 136c, it would also be conceivable for the support wall 130c to have an articulation which designs the region above the articulation so as to be pivotable. It would be conceivable herein for the support wall 130c to have an integral hinge instead of the default breaking point 136c, by way of which integral hinge the upper region is capable of being folded down if and when said upper region impacts on the edge 138c of the opening 132.

The backrest impact safety device 14c has a detent 156c. The detent 156c is provided for limiting the element 84c to a maximum position in the housing 80c. The detent 156c is formed by the support wall 130c which is supported on the housing 80c. The detent 156c limits a movement of the element 84c in the direction of the rearward end of the housing 80c in the housing 80c. In the locked position, the detent 156c impacts the rearward end of the housing 80c.

In the event of a crash, the inertia module 16c is first deflected counter to the spring force of the spring element 112c. The coupling element 118c is released by the deflection of the inertia module 16c, and the form-fit between the housing 80c and the element 84c by way of the coupling element 118c is cancelled. On account thereof, the acceleration required for unlocking the backrest impact safety device 14c may be conceived in a particularly simple and advantageous manner, since only the mass of the mass element 108c and the spring force of the spring element 112c influence this required acceleration. The element 84c is displaced in relation to the housing 80c counter to the flight direction by the deflection of the backrest in the crash. If and when the upper region of the support wall 130c of the element 84c impacts the edge 138c of the opening 132c, said element 84c is severed and the element 84 conjointly with the support wall 130c is displaced farther, counter to the flight direction. The backrest impact safety device 14c comprises a deceleration element 30c. The deceleration element 30c in the event of a crash absorbs at least part of inertia forces which act on the backrest. For absorbing the inertia energy the deceleration element 30c is provided to be plastically deformed. The deceleration element 30c is disposed between the inertia module 16c and the support wall 130c. If and when the element 84c is displaced by a defined displacement path, the deceleration element 30c is jammed and deformed between the inertia module 16c which is supported on the shoulder 128c of the housing 80c and the support wall 130c, on account of which said deceleration element 30c absorbs energy (see FIG. 9). Upon partial unlocking, the backrest may be moved back to a locked position by way of the backrest impact safety device 14c. To this end, the element 84c is pushed back into the housing 80c again. Herein, the support wall 130c of the element 84c is jammed between an internal wall of the housing 80c and the leaf-spring element 134c, and is thus locked in the locked position.

FIG. 11 shows an airplane seat device according to the invention in a fourth exemplary embodiment. The airplane seat device herein is part of a partially illustrated airplane seat 32d. The airplane seat 32d herein is part of an airplane (not illustrated in more detail). The airplane seat 32d herein in a fitted state is mounted in an airplane cabin of the airplane. The airplane seat device comprises a backrest 10d. The backrest 10d herein is provided so that a person sitting on the airplane seat 32d, of which the airplane seat device is a part, may support his/her back on the backrest 10d. The backrest 10d herein is pivotably articulated on a seat divider (not illustrated in more detail) by way of a bearing point 68d. The airplane seat device furthermore comprises a seat component 12d. The seat component 12d is configured as a transverse reinforcement unit which is provided for reinforcing the backrest 10d in the transverse direction of the transverse reinforcement unit. Moreover, the seat component 12d, configured as a transverse reinforcement unit, is provided for connecting the one side of the airplane seat 32d, of which the airplane seat device is a part, to the further side of the airplane seat 32d. The airplane seat device furthermore has a seat base 58d. In principle, it is also conceivable for the seat component 12d to be configured as a seat base or as a component of the seat structure. The seat base 58d configures a seat face. The seat base 58d is coupled to the backrest 10d.

The airplane seat device comprises a backrest impact safety device 14d. The backrest impact safety device 14d at least in a normal operating state is provided for rigidly connecting the backrest 10d to the seat component 12d in a locked position. In the normal operating state which reflects a normal and orderly use of the airplane seat 32d, forces may be transmitted from the backrest 10d to the seat component 12d by way of the backrest impact safety device 14d. The backrest impact safety device 14d is provided for partially decoupling the backrest 10d from the seat component 12d in at least an operating state. Through the partial decoupling of the backrest 10d from the seat component 12d, in the event of a crash, the backrest 10d and the seat component 12d may perform a mutually relative movement so as thus to reduce the risk of injury to a passenger sitting on the airplane seat 32d. The backrest impact safety device 14d herein is configured like a backrest impact safety device as described in the preceding exemplary embodiments.

The airplane seat device comprises an additional force element 140d. The additional force element 140d is provided for at least temporarily accelerating the backrest 10d immediately prior to partial decoupling. The additional force element 140d herein is configured as a gas compression spring. In principle, it is also conceivable for the additional force element 140d to be configured as a mechanical spring element or as an electro-magnetic spring element. In principle, it is likewise conceivable for the additional force element 140d to be configured as a pyrotechnical element which provides the additional force thereof by a pyrotechnical effect. The additional force element 140d in functional terms is disposed between the backrest 10d and the seat component 12d. The additional force element 140d herein in functional terms is disposed between a housing 80d of the backrest impact safety device 14d and an element 84d which is disposed so as to be movable in the housing 80d. In order to be linked to the housing 80d, the additional force element 140d has a first linkage point 142d by way of which the additional force element 140d is rigidly connected to the housing 80d. The linkage point 142d is disposed on a housing 144d of the additional force element 140d. The additional force element 140d has a second linkage point 146d by way of which the additional force element 140d is rigidly connected to the element 84d of the backrest impact safety device 14d. The linkage point 146d is disposed on a deployable piston 148d of the additional force element 140d.

In the locked position of the backrest impact safety device 14d the additional force element 140d is disposed so as to be pretensioned between the two linkage points 142d, 146d thereof. The additional force element 140d provides a spring force which pushes apart the mutually movable parts of the backrest impact safety device 14d, such as in particular the housing 80d and the element 84d. In the locked state of the backrest impact safety device 14*d* the additional force element 140*d* has no influence on the system. If and when the backrest impact safety device 14*d* is unlocked during the event of the crash, the additional force element 140*d* is able to provide the spring force thereof and in this way push apart the element 84*d* and the housing 80*d*. The spring force that is provided by the additional force element 140*d* herein acts in the same direction as the deceleration force during the event of the crash. On account thereof, a readjustment of the backrest 10*d* is initially accelerated. On account thereof a risk of injury to a passenger may be advantageously reduced, since the backrest is additionally accelerated and an impact force of a head of a passenger sitting on the rearward air passenger seat on the backrest 10*d* can be reduced, since a speed differential between the head of the passenger and the backrest can be advantageously reduced. Upon additional acceleration of the backrest 10*d* by the additional force element 140*d*, the backrest 10*d* as is the case in the preceding exemplary embodiments is decelerated by a deceleration element which is not to be described in more detail herein. A description of the deceleration element and of all other elements of the airplane seat device that are not illustrated or described in more detail herein may be derived from the preceding exemplary embodiments.

LIST OF REFERENCE SIGNS

10 Backrest
12 Seat component
14 Backrest impact safety device
16 Inertia module
18 Linkage element
30 Deceleration element
32 Airplane seat
58 Seat base
66 Flight direction
68 Bearing point
80 Housing
82 Linkage element
84 Element
86 Linkage element
88 Locking module
90 Locking element
92 Locking element
94 Bearing point
96 Bearing point
98 Passage opening
100 Spring element
102 Form-fitting element
104 Form-fitting element
106 Form-fitting element
108 Mass element
110 Activation contour
112 Spring element
114 Entrainment element
116 Form-fitting element
118 Coupling element
120 Notch
122 Notch
124 Form-fitting element
126 Depression
128 Shoulder
130 Support wall
132 Opening
134 Leaf-spring element
136 Default breaking point
138 Edge
140 Additional force element
142 Linkage point
144 Housing
146 Linkage point
148 Piston
150 Aperture
152 Chamber
154 Chamber
156 Detent
158 Elevation

The invention claimed is:

1. An airplane seat device comprising:
at least one mounting unit;
at least one backrest, which is pivotally mounted to the mounting unit through a bearing point;
at least one seat component that is coupled to the backrest; and
a backrest impact safety device, wherein
in at least a normal operating state, the backrest impact safety device is configured to rigidly connect the backrest to the seat component in a locked state, and, in at least one further operating state, the backrest impact safety device at least partially decouples the backrest from the seat component,
the backrest impact safety device is configured to at least partially reduce impact forces on the backrest at least in the event of a crash,
after the at least partial decoupling of the backrest from the seat component, the backrest impact safety device is configured to be locked in the locked state again, and
the backrest impact safety device is configured to decouple the backrest from the seat component before impact forces act upon the backrest.

2. The airplane seat device as claimed in claim 1, wherein the backrest impact safety device comprises at least one locking module, which, in a locked condition, allows forces to be transmitted from the backrest to the seat component and, in an unlocked condition, at least partially decouples the backrest from the seat component, and
the backrest impact safety device is transferable from the unlocked state to the locked state.

3. The airplane seat device as claimed in claim 2, wherein the locking module has at least one locking element, which is deflectable counter to an elastic force and which in a resting state holds the backrest impact safety device in the locked state.

4. The airplane seat device as claimed in claim 3, wherein the backrest impact safety device comprises at least one inertia module for unlocking the backrest impact safety device, and
the inertia module is configured to at least temporarily deflect at least the locking element.

5. The airplane seat device as claimed in claim 3, wherein the at least one locking element is configured as a pivotal lever that is fixedly connected to a housing.

6. The airplane seat device as claimed in claim 3, wherein the at least one locking element, which is deflectable counter to an elastic force, is configured as an elastically deformable lever that is fixedly connected to a piston.

7. The airplane seat device as claimed in claim 1, wherein the backrest impact safety device comprises at least one inertia module which in the event of a crash is transferred from a lock position into an unlock position, and wherein the backrest impact safety device is in the unlocked state when the inertia module is transferred to the unlock position.

8. The airplane seat device as claimed in claim 7, wherein the backrest impact safety device has at least one spring element, which is configured to hold the inertia module in the lock position.

9. The airplane seat device as claimed in claim 7, wherein the inertia module in the event of a crash is configured to be transferred from the lock position prior to the impact forces taking effect.

10. The airplane seat device as claimed in claim 7, wherein the inertia module for unlocking the backrest impact safety device is configured to at least temporarily deflect at least a locking element.

11. The airplane seat device as claimed in claim 1, wherein
the backrest impact safety device includes a housing, which includes a linkage element,
the linkage element is configured to be coupled to the seat component or to the backrest, and
the housing has at least one element that is displaceably mounted in the housing and that includes at least one additional linkage element, which is configured to be coupled to the seat component or to the backrest.

12. The airplane seat device as claimed in claim 11, wherein
the housing and the element that is displaceably mounted are intercoupled by a locking module at least in the locked state of the backrest impact safety device, and
the element that is displaceably mounted is axially displaceable.

13. The airplane seat device as claimed in claim 11, wherein the element that is displaceably mounted and the housing are intercoupled by a locking module at least in the locked state of the backrest impact safety device.

14. The airplane seat device as claimed in claim 1, wherein
the backrest impact safety device has at least one deceleration element for absorbing inertia energy of the backrest after the at least partial decoupling, and
the deceleration element is configured to be plastically deformed.

15. The airplane seat device as claimed in claim 1, wherein
the backrest impact safety device has at least one deceleration element for absorbing inertia energy of the backrest after the at least partial decoupling, and
the deceleration element is configured to compress a fluid.

16. An airplane seat having at least one airplane seat device as claimed in claim 1.

17. The airplane seat device as claimed in claim 1, wherein
the backrest impact safety device comprises at least one locking module, which, in a locked condition, allows forces to be transmitted from the backrest to the seat component and, in an unlocked condition, at least partially decouples the backrest from the seat component, and
the backrest impact safety device is transferable from the unlocked state to the locked state.

* * * * *